US007638968B2

(12) United States Patent
Inoue et al.

(10) Patent No.: US 7,638,968 B2
(45) Date of Patent: Dec. 29, 2009

(54) ELECTRICAL DEVICE

(75) Inventors: Koichi Inoue, Sumoto (JP); Toshiki Nakasho, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 310 days.

(21) Appl. No.: 11/504,043

(22) Filed: Aug. 15, 2006

(65) Prior Publication Data

US 2007/0046257 A1 Mar. 1, 2007

(30) Foreign Application Priority Data

Aug. 17, 2005 (JP) ............................ 2005-237014

(51) Int. Cl.
*H02J 7/00* (2006.01)

(52) U.S. Cl. ........................ 320/107; 439/131; 439/132

(58) Field of Classification Search ................. 320/107; 439/131-132

See application file for complete search history.

(56) References Cited

U.S. PATENT DOCUMENTS 5,613,863 A * 3/1997 Klaus et al. ................. 439/131
6,042,400 A * 3/2000 Queffelec et al. ........... 439/131
6,270,364 B1 * 8/2001 Wang ......................... 439/131
2002/0119687 A1 * 8/2002 Wu ............................ 439/131
2005/0176281 A1 * 8/2005 Zhuge ........................ 439/173

FOREIGN PATENT DOCUMENTS

JP 7-264855 10/1995
JP 7-320827 12/1995

* cited by examiner

*Primary Examiner*—Edward Tso
*Assistant Examiner*—Samuel Berhanu
(74) *Attorney, Agent, or Firm*—Wenderoth, Lind & Ponack, L.L.P.

(57) ABSTRACT

An electrical device includes a device body and a conversion plug. An AC plug is connected to an outlet with the conversion plug being detached. The conversion plug is connected to an outlet with a different shape with the conversion plug being connected to the AC plug. The AC plug includes an insulating pivot mount that has a pair of plug blades and is connected to the device body. The insulating pivot mount of the AC plug is provided with a retaining recessed portion that opens on the surface side of the device body. The conversion plug includes a retaining hook that is retained to the retaining recessed portion disposed in the insulating pivot mount of the AC plug. The conversion plug is connected to the device body via the AC plug in a state where the retaining hook is retained to the retaining recessed portion, and the plug blades are inserted into plug insertion portions.

25 Claims, 8 Drawing Sheets

ELECTRICAL DEVICE

BACKGROUND OF THE INVENTION

1. Field of the Invention

The present invention relates to an electrical device that is supplied with electric power from a commercial power supply with its plug being inserted into an outlet.

2. Description of the Related Art

Electrical devices, which are supplied with electric power from a commercial power supply, are used with their plugs being connected to outlets for use. There are different standards of commercial power supplies depending on countries or areas for use. Accordingly, in addition to voltages or frequencies, shapes of insertion holes of outlets or plugs plugged thereto are different depending on the standards. For this reason, in different countries or areas for use, it is necessary to design electrical devices with different specifications. However, if electrical devices are manufactured depending on different shapes of plugs, they can be used only in specific countries.

This disadvantage can be solved by a case that can be detachably connected to a plug (see Japanese Laid-Open Patent Publications TOKUKAI No. HEI 7-264855 and No. HEI 7-320827).

SUMMARY OF THE INVENTION

Electrical devices with cases connected to conversion plugs are connected to conversion plugs that work with outlets in multiple countries. The electrical devices of this structure should be used with conversion plugs in the case where they are used in all countries. For this reason, in the case where electrical devices capable of being used in Japan and foreign countries are used in Japan, for example, conversion plugs should be attached to the electrical devices. In this case, there is a disadvantage that they cannot be used in Japan as its home country for use, if their conversion plugs for Japan become lost, in the case of use in foreign countries, for example.

In addition, they are required to include a case with an attachment/detachment recessed portion that connects a conversion plug to the case, and further to include, in the attachment/detachment recessed portion, a mechanism that retains the conversion plug so as not to be detached. For this reason, a connection structure between the conversion plug and the case is complicated. Accordingly, there is a disadvantage that makes simple design difficult.

Therefore, the present invention has been developed to solve the above disadvantages. It is an important object to provide an electrical device that can be connected to different outputs either in a state where a conversion plug is not used or in a state where it is used, and is provided with a retaining recessed portion in an insulating pivot mount of a collapsible AC plug so as to connect the conversion plug by retaining a retaining hook of the conversion plug to the retaining recessed portion to firmly connect the conversion plug to a device body, the AC plug being collapsed so as to simplify the whole design and to provide an aesthetic appearance, in a state where the conversion plug and the AC plug are not used.

To achieve the foregoing object, an electrical device according to the present invention has the following construction.

The electrical device includes a device body that is provided with an AC plug pivotably connected thereto, the AC plug having a pair of plug blades, and a conversion plug that is detachably connected to the AC plug of the device body. The AC plug is connected to an outlet with the conversion plug being detached from the AC plug, and the conversion plug is connected to an outlet with a shape different from the outlet for the AC plug with the conversion plug being connected to the AC plug. The AC plug includes an insulating pivot mount that has the pair of the plug blades fastened thereto. The insulating pivot mount is pivotably connected to the device body. The insulating pivot mount is connected to the device body such that the AC plug can pivot in a plane parallel to the planes of both the plug blades. The device body is provided with a guide space portion that opens to accommodate the plug blades of the AC plug in the collapsed state. The guide space portion includes first and second space sections and that separately accommodate the plug blades. In addition, the insulating pivot mount of the AC plug is provided with a retaining recessed portion that opens on the surface side of the device body in a state where the plug blades stand in an upright posture. The conversion plug includes plug insertion portions that receive the plug blades of the AC plug inserted thereto, and includes a retaining hook that is retained to the retaining recessed portion disposed in the insulating pivot mount of the AC plug. The conversion plug is connected to the device body via the AC plug in a state where the retaining hook is retained to the retaining recessed portion, and the plug blades are inserted into the plug insertion portions.

The aforementioned electrical device can be connected to different types of outlets depending on whether a conversion plug is used or not. The electrical device can have a structure that can be used for outlets in Japan without using the conversion plug. Accordingly, for outlets which are mainly used, it can be conveniently used as a structure that can be used without using the conversion plug. In addition, since, in a state where the conversion plug is not used, an AC plug is directly connected to the outlet and is used, this causes less poor contact as compared with a state where a conversion plug is used.

Furthermore, in the aforementioned electrical device, a retraining recessed portion is disposed in a collapsible insulating pivot mount for plug blades such that a retaining hook of the conversion plug is retained to the retaining recessed portion to connect the conversion plug to a device body, thus, the conversion plug can be firmly connected to the device body. In addition, in a state where neither the conversion plug nor the AC plug is used, the AC plug is collapsed, thus, it is possible to simplify the whole design and to provide an aesthetic appearance.

Furthermore, in the aforementioned electrical device, the device body is provided with the conversion plug, and the retaining recessed portion is disposed in the insulating pivot mount of the AC plug. Additionally, the retaining hook that is disposed in the conversion plug is retained to the retaining recessed portion for connection. Therefore, the conversion plug can be stably and securely connected to the device body. The reason is that the retaining hook can be located at a position close to the plug blades between a pair of the plug blades.

The insulating pivot mount of the AC plug can be provided with the retaining recessed portion between the pair of the plug blades.

In the electrical device according to the present invention, the conversion plug and the device body can be detachably connected by a lock mechanism. The lock mechanism includes a lock hook that is disposed in the device body, a lock retaining portion that is arranged in the conversion plug so as to be connected to the lock hook, and a stopper that keeps a state where the lock hook is connected to the lock retaining portion. The lock hook can be located between first and second space portions.

Furthermore, in an electrical device according to the present invention, the device body is provided with the AC plug having the pair of the plug blades in a state of upright posture, and the conversion plug is detachably connected to the AC plug. The conversion plug and the device body are detachably connected by a lock mechanism. The lock mechanism includes a lock hook that is disposed in the device body, a lock retaining portion that is arranged in the conversion plug to connect the lock hook, and a stopper that keeps the state where the lock hook is connected to the lock retaining portion. In addition, the device body is provided with a retaining recessed portion that opens on the surface side of the device body. The conversion plug includes plug insertion portions that receive the plug blades of the AC plug inserted thereto, and a retaining hook that is retained to the retaining recessed portion, the conversion plug being connected to the device body via the AC plug in a state where the retaining hook is retained to the retaining recessed portion, and the plug blades is inserted into the plug insertion portions.

The above and further objects and features of the invention will more fully be apparent from the following detailed description with accompanying drawings.

DETAILED DESCRIPTION OF THE PREFERRED EMBODIMENT

Figure 1:
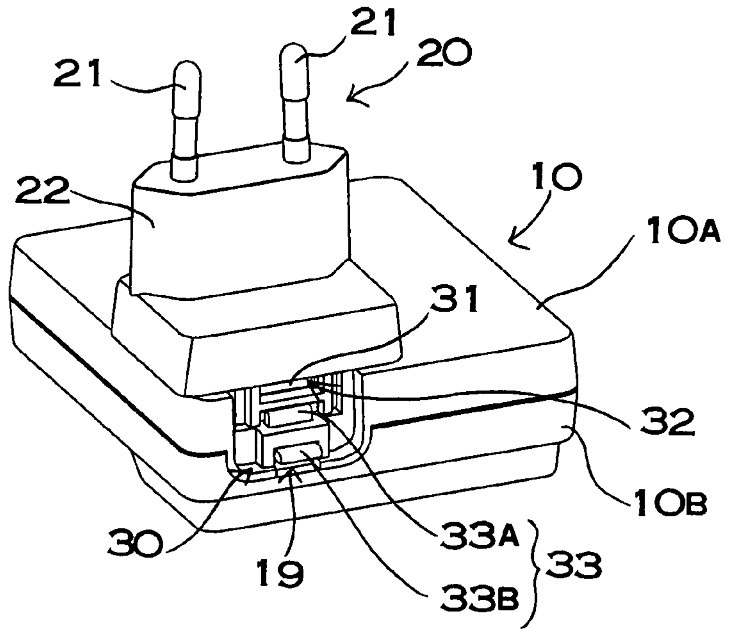
FIG. 1 is a perspective view showing an electrical device according to one embodiment of the present invention, with a conversion plug being attached to a device body.
Figure 2:
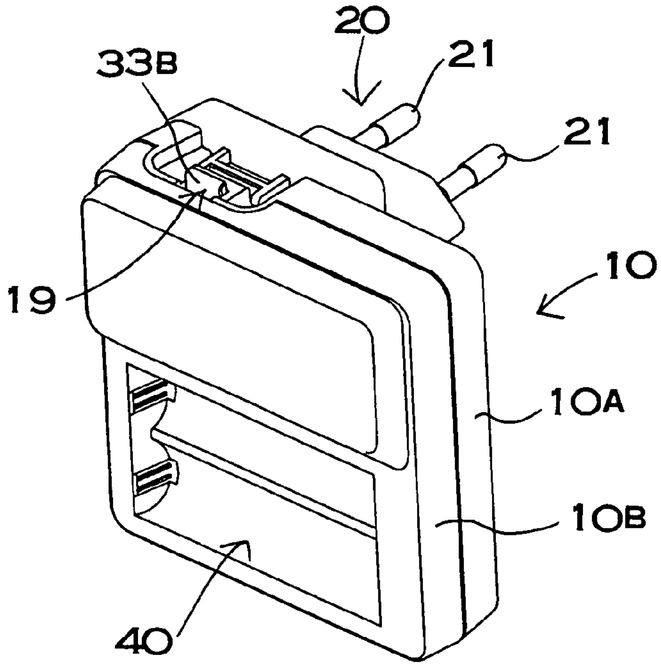
FIG. 2 is a perspective view showing a posture where the plug of the electrical device shown in FIG. 1 is plugged to a wall outlet.
Figure 3:
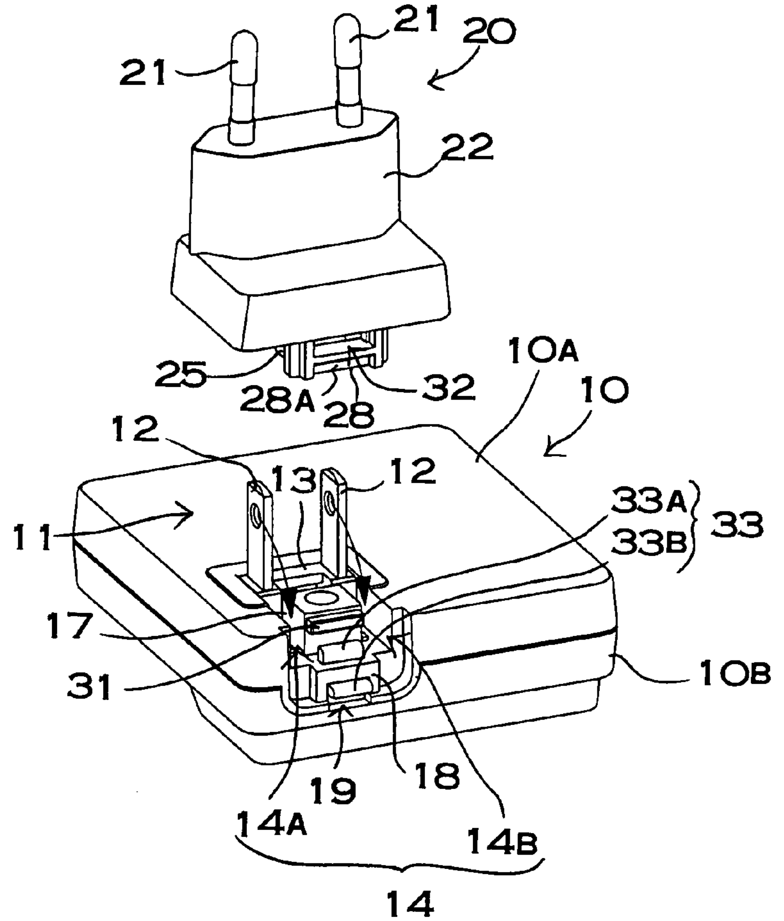
FIG. 3 is a perspective view showing the electrical device shown in FIG. 1, with the conversion plug being detached from the device body.

An electrical device shown in FIGS. 1 through 6 includes a device body 10 that is provided with an AC plug 11 pivotably connected thereto, and a conversion plug 20 that is detachably connected to the AC plug 11 of the device body 10. The electrical device shown in these figures is connected to an outlet (not shown) with the AC plug 11, with the conversion plug 20 being detached, as shown in FIG. 3. On the other hand, it is connected to an outlet (not shown) with a shape different from the outlet corresponding to the AC plug 11, with the conversion plug 20 being connected to the AC plug 11, as shown in FIG. 1.

The device body 10 in this embodiment has an appearance of a plastic two-piece case that is composed of body cases 10A and 10B. The electrical device is a charger that is provided with a recessed portion 40 on the front side of the device body 10 such that two cylindrical rechargeable batteries are attached thereto to be charged, as shown in FIG. 2. In this embodiment, in the state of FIG. 2, the plug is plugged to an indoor wall outlet to charge them. In the description of this embodiment, except in the case where individual parts and so on are specifically described, in the state of the device body 10 shown in FIG. 2, the surface side of the paper is referred to as the front side, and the side behind it and the top side of the paper are referred to as the back side and top side, respectively.

Figure 5:
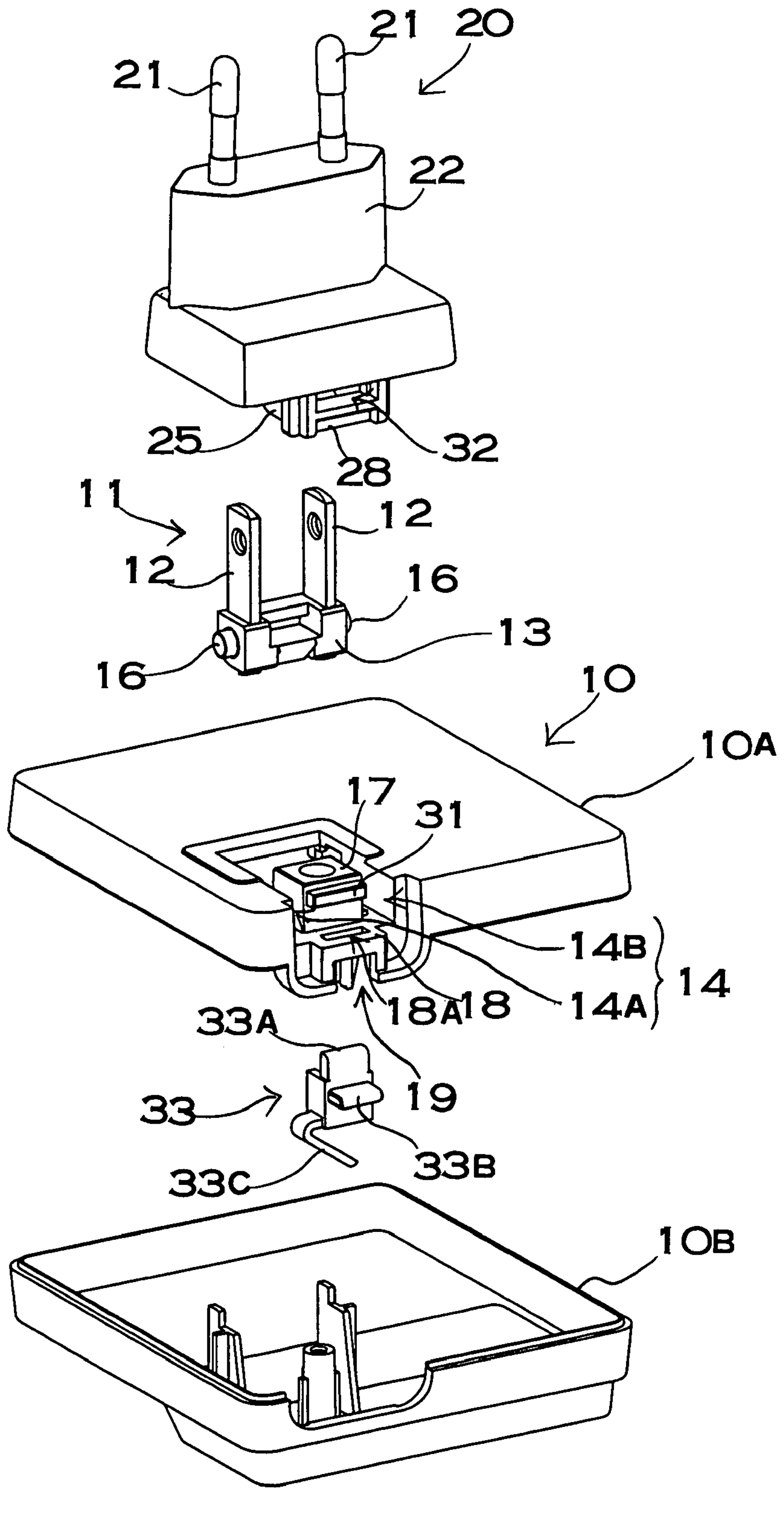
FIG. 5 is an exploded perspective view showing a state where the device body of the electrical device shown in FIG. 3 is taken apart.

The AC plug 11 shown in an exploded view of FIG. 5 is provided with plug blades 12 that are composed of a pair of planar metal plates and are fastened to an insulating pivot mount 13 made of plastic. The insulating pivot mount 13 is provided with pivot shaft portions that protrude from its both ends and are rotatably connected to the device body. The AC plug is connected to the device body 10 pivotably about this insulating pivot mount. In addition, though not illustrated, the pair of plug blades 12 are connected to a power circuit installed in the device body 10 to supply commercial power to the power circuit. The power circuit has characteristics adapted to the commercial power specifications of the countries in the world.

As shown in FIG. 3, the pivot shaft portions of the insulating pivot mount 13 are connected to the device body 10 such that the AC plug 11 can pivot in a plane parallel to the planes of both the plug blades 12. The AC plug 11 that pivots in this posture is provided with the pivot shaft portions 16 that are integrally formed perpendicular to the planes of both the plug blades 12 on the both ends of the plastic, insulating pivot mount 13, as shown in the exploded view of FIG. 5. A pair of the pivot shaft portions 16 are located base ends of the plug blades 12 and aligned with each other in line. The device body 10 is provided with pivot holes (not shown) that rotatably support the pivot shaft portions 16. The pivot holes support the pivot shaft portions 16, thus, the AC plug 11 is pivotably connected to the device body 10.

In this embodiment, the electrical circuit inside the electrical device and the plug blades 12 are not electrically connected by an internal structure (not shown) in a state where the plug blades 12 are collapsed. On the other hand, the electrical circuit inside the electrical device and the plug blades 12 are electrically connected, in a state where the plug blades 12 stand.

The device body 10 is provided with a guide space portion 14 that is located on its surface and opens to accommodate the plug blades 12 of the AC plug 11 in the collapsed state. The AC plug 11 in the collapsed state does not protrude from the device body 10. In the device body 10 shown in FIG. 3, the AC plug 11 in the collapsed state is located on an upper part of the device body 10 as viewed in this figure. Thus, the guide space portion 14 is arranged to open toward the top of the device body 10 (the surface side of the paper in FIG. 3). Since the AC plug 11 includes the pair of the plug blades 12, in order to accommodate the pair of the plug blades 12, the guide space portion 14 has first and second space sections 14A and 14B that separately accommodate the respective plug blades 12. Since the AC plug 11 pivots in planes including the planes of both the plug blades 12, each of the first and second space sections 14A and 14B of the guide space portion 14 is formed in a groove shape with a width greater than the thickness of the plug blade 12.

Since the AC plug 11 pivots in the planes parallel to the planes of both the plug blades 12, the width of each of the first and second space sections 14A and 14B that separately accommodate the respective plug blades 12 can be narrow in a direction perpendicular to the pivot plane of the plug blade 12.

Figure 6:
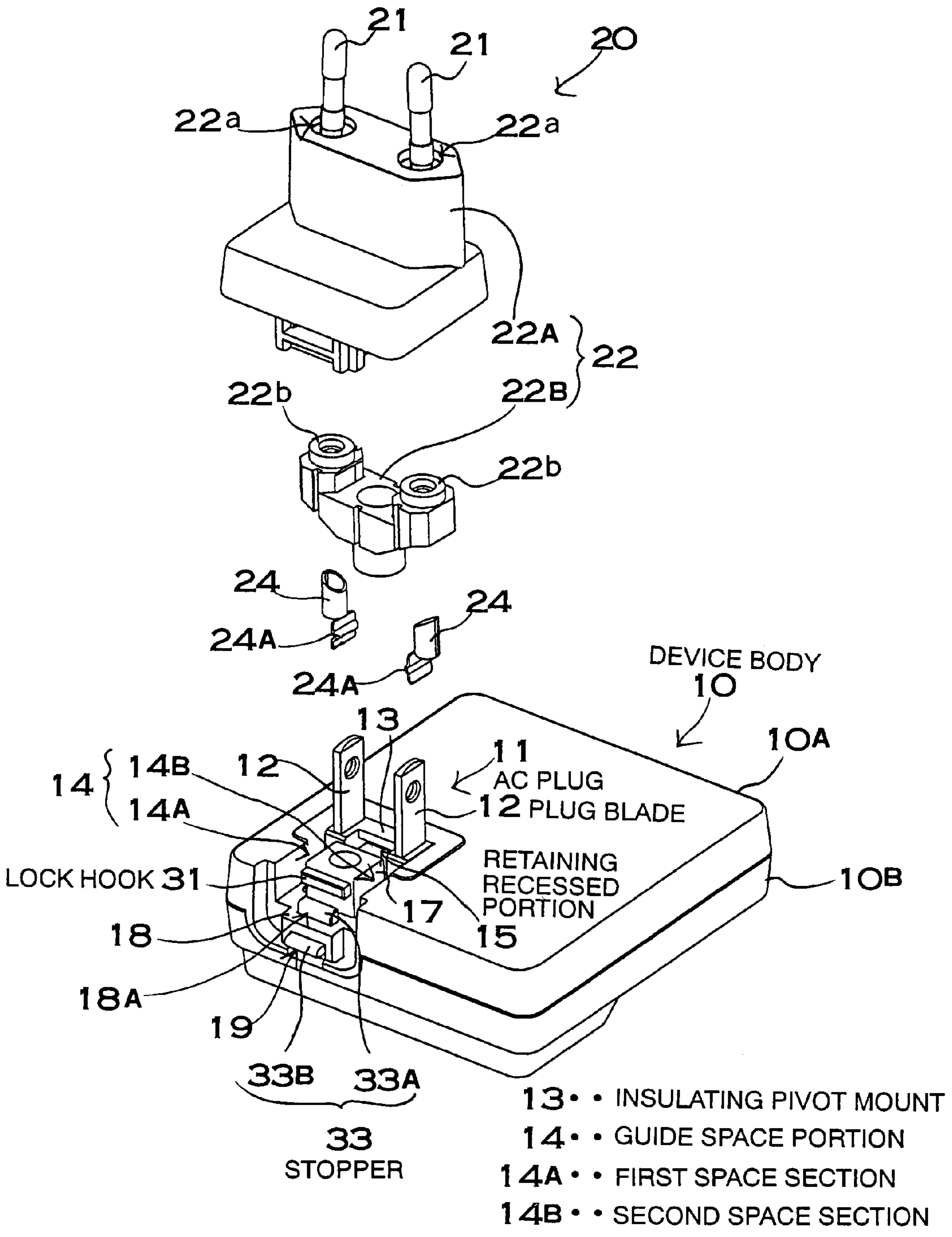
FIG. 6 is an exploded perspective view showing a state where the conversion plug of the electrical device shown in FIG. 3 is taken apart.

As shown in FIG. 6, in the conversion plug 20, a pair of pin plugs 21 are fastened to an insulating holder 22. The pin plugs 21 are metal rods. The insulating holder 22 is made of plastic, and has a main holder 22A and an inner holder 22B that is fastened to the main holder 22A. The inner holder 22B is fastened to the main holder 22A, thus, the pin plugs 21 are fastened to the insulating holder 22. As shown in a cross-sectional view of FIG. 7, the main holder 22A is provided with a pair of through holes 22*a* that open wider than the pin plug 21, and is formed in a hollow body such that the inner holder 22B and the plug blades 12 can be inserted therein. The inner holder 22B is inserted and fitted into the hollow part of the main holder 22A, and thus is held in position. In the insulating holder 22 in the figure, the inner holder 22B is fastened to the main holder 22A by a fastening screw (not show). The fastening screw passes through the center of the inner holder 22B. Its tip is screwed into the center part of the main holder 22A. The pin plugs 21 are fastened to the inner holder 22B by insert. However, it is not always necessary to fasten the pin plugs to the inner holder by insert. They may be fastened by a fit or with an adhesive. The inner holder 22B has cylindrical portions 22*b* that hold the peripheries of the pin plugs 21 and are inserted to the through holes 22*a* of the main holder 22A, and thus holds the pin plugs 21 in position.

Figure 7:
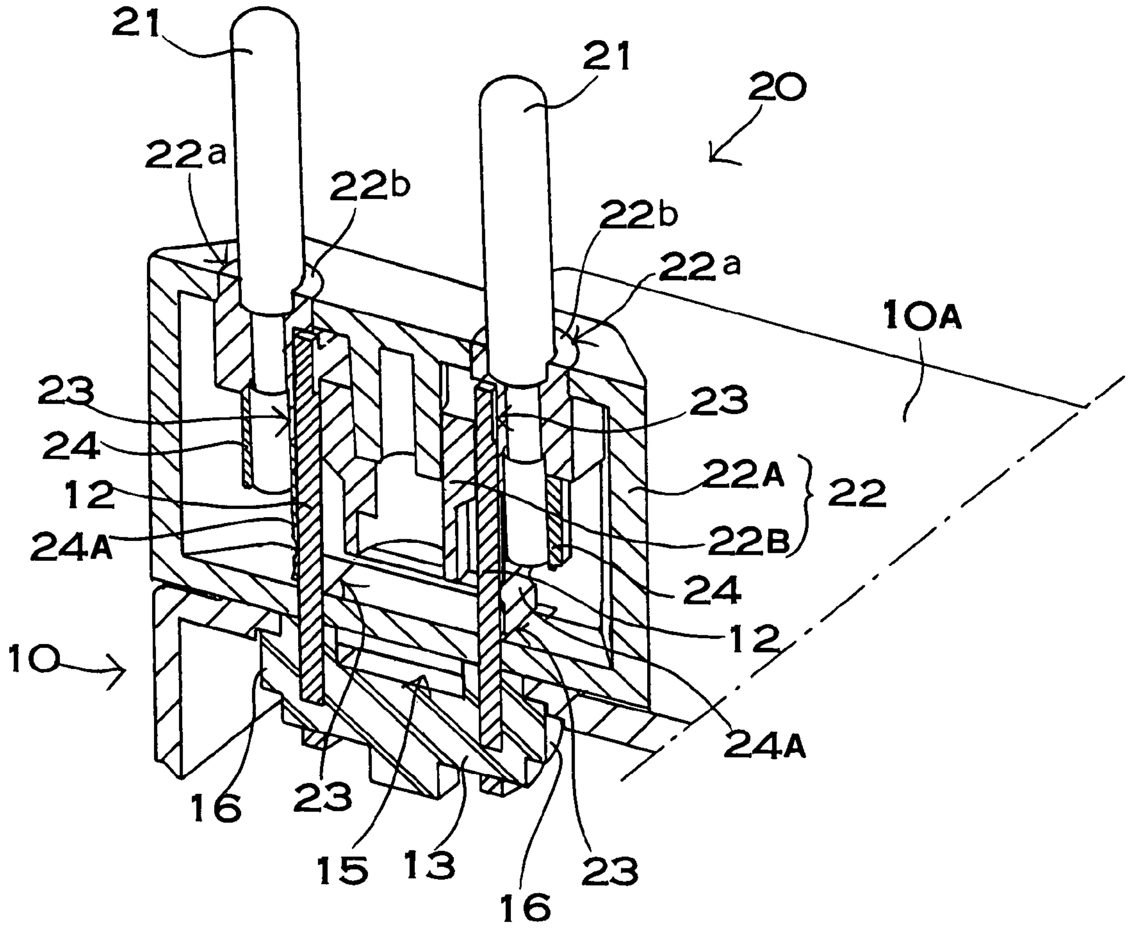
FIG. 7 is a perspective view with the conversion plug shown in FIG. 1 being partially shown in a cross-sectional view.
Figure 8:
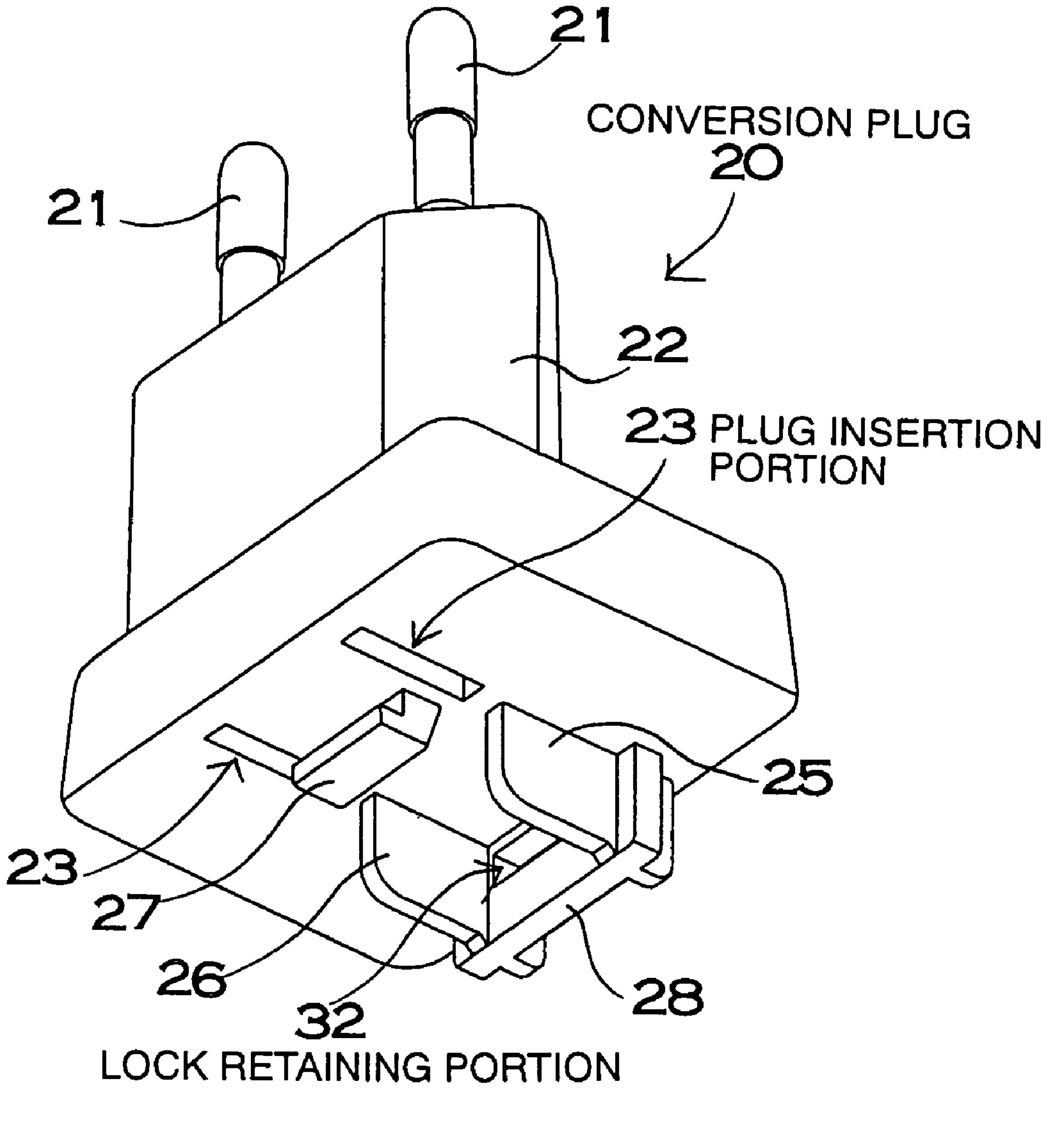
FIG. 8 is a bottom perspective view of the conversion plug.

In addition, the insulating holder 22 of the conversion plug 20 is provided with plug insertion portions 23 that are fitted to the plug blades 12 of the AC plug 11 inserted thereto to be connected to the AC plug 11, as shown in FIGS. 7 and 8. The plug insertion portions 23 are disposed in the main holder 22A and inner holder 22B. The plug insertion portion 23 has an inside width wider than the outside width of the plug blade 12 such that the plug blades 12 inserted thereto move in a direction parallel to the surfaces of the plug blades 12. In a state where the plug blades 12 are inserted into the plug insertion portions 23, the conversion plug 20 is moved in a direction shown by an arrow in FIG. 10 and attached to the device body so as not to be detached.

In addition, the insulating holder 22 of the conversion plug 20 includes connection mechanisms 24 that electrically connect the pair of the plug blades 12 to the pin plugs 21 in a state where the plug blades 12 of the AC plug 11 are inserted into the plug insertion portions 23. The connection mechanisms 24 shown in FIG. 6 are resilient contacts that are fastened to the bottom ends of the pin plugs 21. The resilient contacts are connected to the bottom ends of the pin plugs 21 at their top ends as viewed in the figure by a caulking structure. However, the resilient contacts may resiliently press or resiliently sandwich the bottom ends of the pin plug for connection. Additionally, resilient connection arms 24A are disposed in the bottom part of the resilient contacts. The resilient connection arms 24A are resiliently pressed against the surfaces of the plug blades 12 of the AC plug 11 inserted into the plug insertion portions 23 and are in contact with them, and thus provide electric connection. Accordingly, the resilient connection arm 24A are located at insertion positions for the plug blades 12.

In addition, the insulating holder 22 of the conversion plug 20 is provided with a retaining hook 27 that is connected to the collapsed AC plug 11 in a state where the plug blades 12 of the AC plug 11 are inserted into the plug insertion portions 23, in other words, the conversion plug 20 is connected to the device body 10. The retaining hook 27 is retained to a retaining recessed portion 15 that is arranged in the insulating pivot mount 13 of the AC plug 11 such that the conversion plug 20 is connected to the device body 10.

Figure 4:
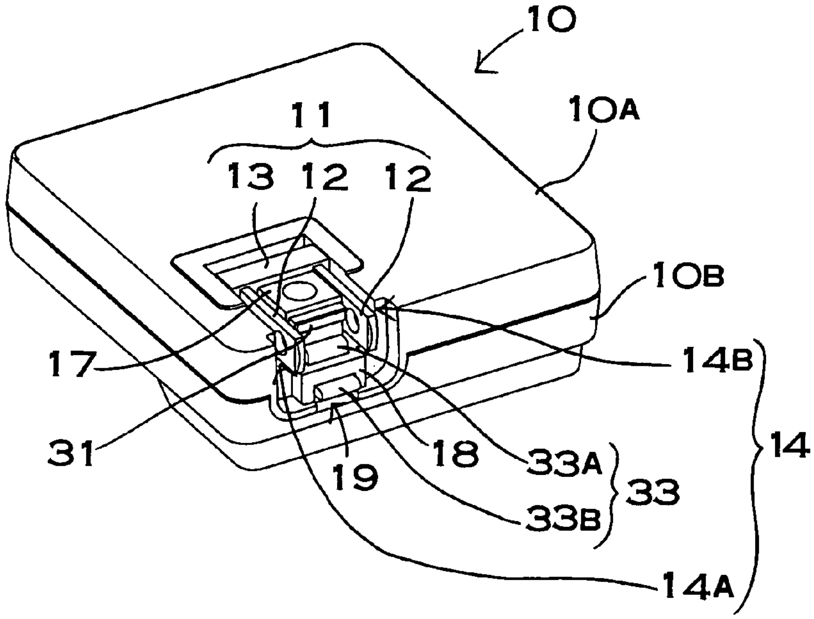
FIG. 4 is a perspective view showing a state where the AC plug of the device body shown in FIG. 3 is collapsed.

In order to connect the retaining hook 27 of the conversion plug 20, the AC plug 11 of the device body 10 is provided with the retaining recessed portion 15 that is disposed in the insulating pivot mount 13. The insulating pivot mount 13 is provided with the retaining recessed portion 15 between the plug blades 12. In a state where the plug blades 12 stand upright, the retaining hook 27 is connected to the retaining recessed portion 15 and thus is retained to the insulating pivot mount 13 of the AC plug 11. Accordingly, the insulating pivot mount 13 is provided with the retaining recessed portion 15 that opens on the surface side of the device body 10 in a state where the plug blades 12 stand in an upright posture, as shown in FIGS. 3, 5 and 6. It is not necessary to provide the retaining recessed portion 15 on the surface side of the device body in the insulating pivot mount 13 in the state where the plug blades 12 are collapsed in a horizontal posture. For this reason, the insulating pivot mount 13 is formed so as to have a flat surface that faces the surface side of the device body 10 in the state where the plug blades 12 are collapsed, as shown in FIG. 4.

The retaining hook 27 is inserted into the retaining recessed portion 15 and moved in the direction shown by the arrow to be retained. As shown in cross-sectional views of FIGS. 9 through 11, an opening of retaining recessed portion 15 is narrower, thus, the retaining hook 27 of the conversion plug 20 is retained. The conversion plug 20 is moved in the direction shown by the arrow in FIG. 10, thus the retaining hook 27 is retained to the retaining recessed portion 15 of the figure. For this purpose, the width of the bottom of the retaining recessed portion 15 is wider in the direction shown by the arrow in FIG. 10. In other words, the bottom of the retaining recessed portion 15 is deep.

FIG. 8 shows the retaining hook 27 of the conversion plug 20. The retaining hook 27 is arranged to protrude from the surface of the insulating holder 22. In addition, the retaining hook 27 is located between the openings of the plug insertion portions 23 to be connected to the retaining recessed portion 15 that is located between the plug blades 12. The bottom end of the retaining hook 27 protrudes in a movement direction of the conversion plug 20, in other words, in a direction parallel to the planes of both the plug blades 12 to form an L-shaped hook as viewed in the cross-sectional views. In order that the retaining hook 27 of the figure is retained to the retaining recessed portion 15 when the conversion plug 20 is moved in the direction shown by the arrow in FIG. 10, its end protrudes in the direction shown by the arrow in FIG. 10.

The retaining hook 27 is retained to the device body 10, thus, the conversion plug 20 of the figure is connected to the device body 10. In addition, the conversion plug 20 and the device body 10 are detachably connected by a lock mechanism 30. The lock mechanism 30 includes a lock hook 31 that is disposed in the device body 10, a lock retaining portion 32 that is disposed in the conversion plug 20, and a stopper 33 that keeps the state where the lock hook 31 is connected to the lock retaining portion 32.

The lock hook 31 is located between the first and second space sections 14A and 14B, as shown in FIGS. 3 and 5. In the figures, the first and second space sections 14A and 14B are located on the back side (upper surface in the figures) of the main case 10A of the device body 10. A rectangular-shaped protrusion portion 17 is arranged between them. However, the protrusion portion 17 protrudes from the bottom of the first and second space sections 14A and 14B, but does not protrudes from the surface of the back side of the device body 10. A cylindrical recessed portion is located in the center of the protrusion portion 17. The head of a screw is accommodated in this recessed portion, thus, the main cases 10A and 10B are fastened by the screw. The rectangular-shaped protrusion portion 17 is formed integrally with a protrusion as the lock hook 31 on an upper part of one of surfaces, in the figures, an upper part of the backside surface that is located in lower right of the rectangular.

In addition, in the rectangular-shaped protrusion portion 17, the stopper 33 is located under the lock hook 31. The stopper 33 keeps the state where the lock retaining portion 32 of the conversion plug 20 is retained to the lock hook 31. In order to arrange the stopper 33, in the device body 10 of the figures, a bottom surface is located in the same plane as the bottom of recessed parts of the first and second space sections 14A and 14B, and extends to form a bottom plate 18. The bottom plate 18 is provided with a stopper opening 18A that allows the stopper 33 to resiliently protrude upward. The stopper opening 18A is an opening that is spaced away from the backside surface of the rectangular-shaped protrusion portion 17. The lock retaining portion 32 of the conversion plug 20 are surrounded and retained so as not to be detached by the stopper 33, the rectangular-shaped protrusion portion 17, the protrusion of the lock hook 31, and the bottom plate 18.

The stopper 33 is integrally formed of plastic as a whole. The stopper 33 of FIG. 5 includes a protrusion portion 33A that protrudes from the stopper opening 18A of the bottom plate 18, a knob portion 33B that keeps a protrusion position of the protrusion portion 33A and forcedly moves the stopper 33 downward, and a resilient arm 33C that protrudes downward. The stopper 33 is resiliently pressed upward by the resilient arm 33 that is integrally formed, thus, the protrusion portion 33A protrudes from the stopper opening 18A of the bottom plate 18. The resilient arm 33C has a substantially V-shape (see FIG. 5), and produces a resilient force by deformation when its tip is pressed inward of the main case 10B. The knob portion 33B protrudes in a lateral direction in the figure, and protrudes from an opening window 19 that is located on the side surface of the device body 10. When the knob portion 33B is pressed and moved downward with a finger or thumb, the protrusion portion 33A can be moved downward from the stopper opening 18A of the bottom plate 18. In a state where it has been pressed and moved downward, the lock hook 31 is attached/detached to/from the lock retaining portion 32.

The conversion plug 20 is formed of plastic integrally with a first connection protrusion portion 25 that is inserted into the first space section 14A of the device body 10, and a second connection protrusion portion 26 that is inserted into the second space section 14B, as shown in FIG. 8. The conversion plug 20 of the figure is provided with the first and second connection protrusion portions 25 and 26 that are formed integrally with the main holder 22A.

The first and second connection protrusion portions 25 and 26 are arranged to protrude from the lower surface of the main holder 22A in the figure. Additionally, the first and second connection protrusion portions 25 and 26 are arranged to protrude in a direction of insertion of the conversion plug 20 into the AC plug 11, in other words, downward in FIGS. 3, 5 through 8, and are inserted into the first and second space sections 14A and 14B in the state where the conversion plug 20 is connected to the AC plug 11.

In addition, this arrangement of the first and second connection protrusion portions 25 and 26 prevents incorrect use by users as discussed below. If a user tries to use only a conversion plug 20 and to insert a separately-prepared plug-blade socket (not shown) into the plug insertion portion 23 of the conversion plug 20, a main body of the plug-blade socket contacts the first and second connection protrusion portions 25 and 26, as a result, the socket cannot be properly inserted. Consequently, an electrical device (not shown) that is supplied with power via the socket cannot be used. Therefore, since an electrical device (e.g., for 100 V use) that is not adapted to the electrical specification for the conversion plug 20 (e.g., 240 V) is not used, the electrical device does not have electrical damage by a high voltage that is applied to the electrical device due to incorrect use.

In the conversion plug 20 of FIG. 8, a rib 28 that connects the first and second connection protrusion portions 25 and 26 is formed integrally with the insulating holder 22 of the device body 10 to form the lock retaining portion 32. The rib 28 is provided with a retaining opening that retains the lock hook 31 and forms the lock retaining portion 32. The protrusion of the lock hook 31 is inserted into the retaining opening, thus, the lock retaining portion 32 is retained to the lock hook 31. The rib 28 that forms the lock retaining portion 32 connects the first and second connection protrusion portions 25 and 26, thus, this structure of the conversion plug 20 is reinforced. Accordingly, since deformation of the first and second connection protrusion portions 25 and 26 is prevented, in a state where they are properly guided to the first and second space sections 14A and 14B, the conversion plug 20 is connected to the device body 10.

The rib 28 is provided with a retaining stair portion 28A. When the knob portion 33B of the stopper 33 is pressed and moved downward with a finger or thumb (the downward movement direction is shown by an arrow near the knob portion 33B in FIG. 11), or when the rib 28 contacts the protrusion portion 33A of the stopper 33, as discussed later, thus, the protrusion portion 33A is moved downward from the stopper opening 18A of the bottom plate 18, thus, the lock hook 31 is attached to the lock retaining portion 32, as a result, the conversion plug 20 can be attached to the device body 10. On the other hand, the lock hook 31 is detached from the lock retaining portion 32, as a result, the conversion plug 20 can be detached from the device body 10. In the case where the conversion plug 20 is attached to the device body 10, when the finger or thumb is moved away from the knob portion 33B, or when the rib 28 is out of contact with the protrusion portion 33A of the stopper 33, the protrusion portion 33A protrudes from the stopper opening 18A of the bottom plate 18, thus, the protrusion portion 33A engages with the retaining stair portion 28A of the conversion plug 20 (see FIG. 11), as a result, the conversion plug 20 is prevented from being detached upward of the body 10.

Figure 9:
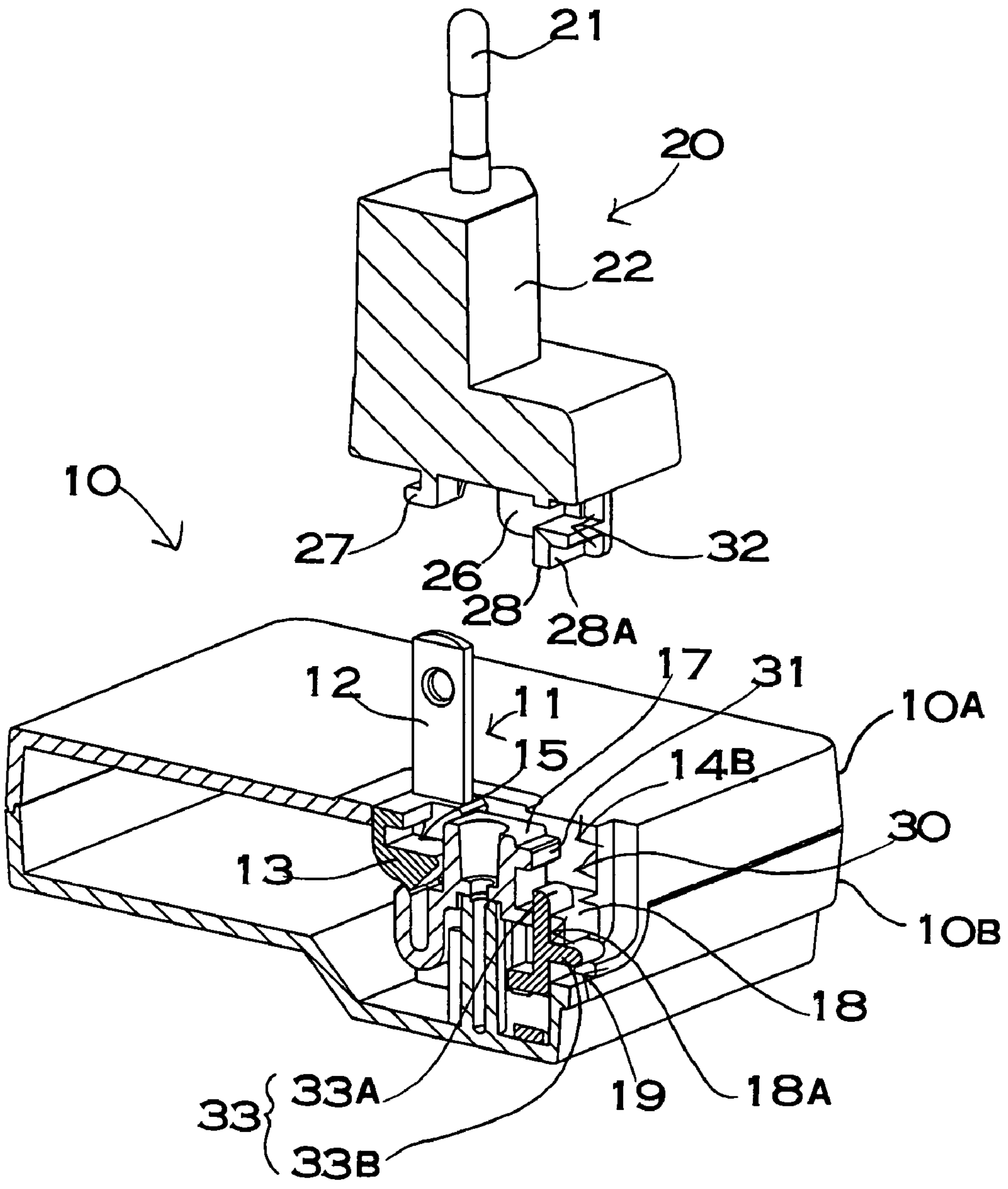
FIG. 9 is an exploded perspective view with a connection structure between the conversion plug and the device body being partially shown in a cross-sectional view.
Figure 10:
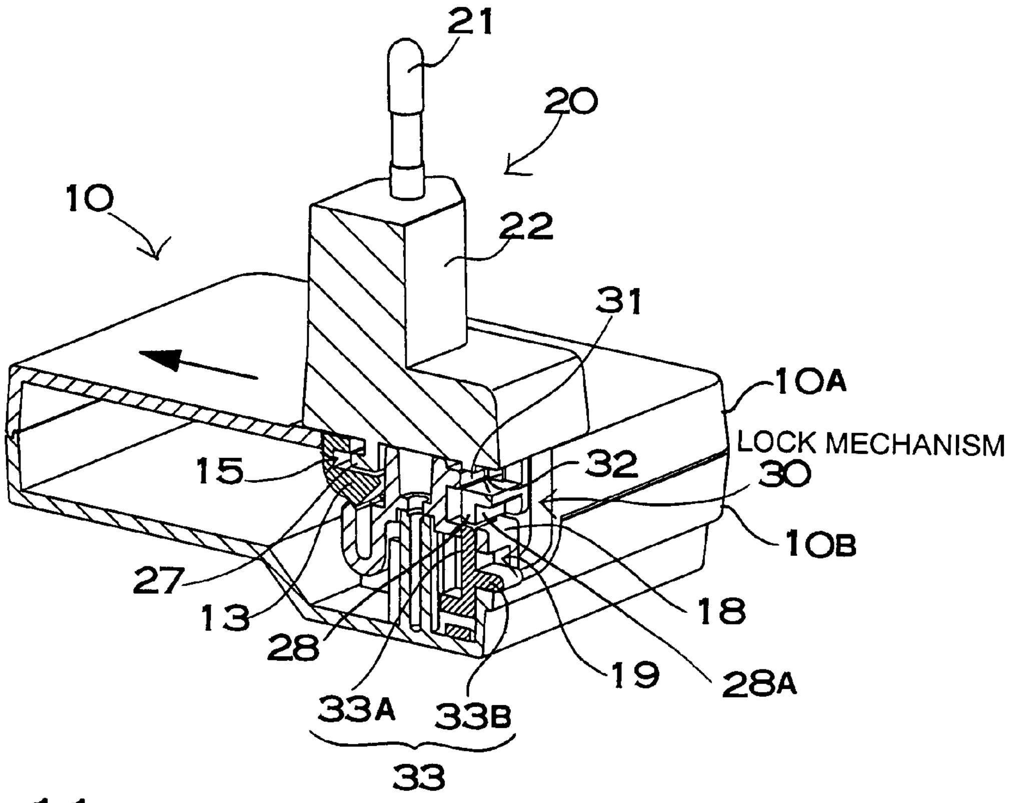
FIG. 10 is a perspective view with a connection structure between the conversion plug and the device body in the middle of attachment being partially shown in a cross-sectional view.
Figure 11:
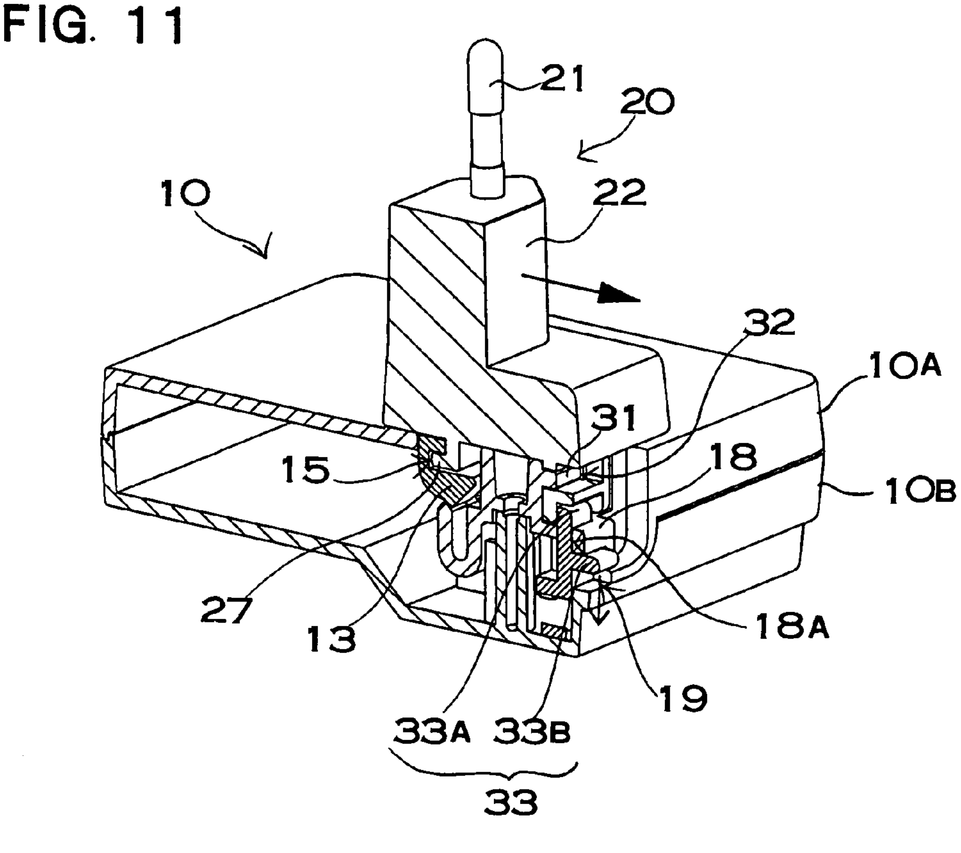
FIG. 11 is a perspective view with a connection structure between the conversion plug and the device body after attachment being partially shown in a cross-sectional view.

As shown in FIGS. 9 through 11, the aforementioned power device is used in a manner discussed below with the conversion plug 20 being attached to the device body 10.

From a position shown in FIG. 10 as shown in FIG. 10, the knob portion 33B is first pressed and moved downward with a finger or thumb, thus, the protrusion portion 33A can be moved downward from the stopper opening 18A of the bottom plate 18. In a state where it has been pressed and moved downward, the lock hook 31 is attached/detached to/from the lock retaining portion 32.

The conversion plug 20 is moved close to the device body 10. In this case, as shown in FIG. 10, the plug blades 12 are inserted into the plug insertion portions 23, while the retaining hook 27 is inserted into the retaining recessed portion 15. In addition, the rib 28 that connects the first and second connection protrusion portions 25 and 26 contacts the protrusion portion 33A of the stopper 33, thus, the protrusion portion 33A is pressed and moved downward. On the other hand, the knob portion 33B may be pressed and moved downward with a finger or thumb, thus, the protrusion portion 33A is pressed and moved downward.

After that, as shown by the arrow in FIG. 10, the conversion plug 20 is moved along the surface of the device body 10 in a direction parallel to the planes of the plug blades 12 to a position in FIG. 11. In this state, the retaining hook 27 is retained to the retaining recessed portion 15, while the lock hook 31 is retained to the lock retaining portion 32. Thus, the conversion plug 20 and the device body 10 are retained by the retaining hook 27 and the retaining recessed portion 15, while they are connected so as not to be detached by the lock hook 31 and the lock retaining portion 32. In addition, the stopper 33 resiliently protrudes to prevent movement of the conversion plug 20 from the position in FIG. 11 back to the position in FIG. 10. As a result, the conversion plug 20 is connected to the device body 10 so as not to be detached.

In this state, the protrusion portion 33A protrudes from the stopper opening 18A of the bottom plate 18 due to a resilient force of the resilient arm 33C such that the protrusion portion 33A is retained to the retaining stair portion 28A of the conversion plug 20, and thus prevents detachment of the conversion plug 20 upward of the body 10.

The conversion plug 20 connected to the device body 10 is detached from the device body 10 as discussed below.

In FIG. 11, the knob portion 33B of the stopper 33 is pressed and moved downward with a finger or thumb (downward movement is shown by the arrow near the knob portion 33B) such that the protrusion portion 33A of the stopper 33 does not protrude from the stopper opening 18A of the bottom plate 18. In this state, the conversion plug 20 is slid in the direction shown by the arrow so as to release the engagement between the retaining hook 27 and the retaining recessed portion 15, the engagement between the lock hook 31 and the lock retaining portion 32, and the engagement between protrusion portion 33A and the retaining stair portion 28A of the conversion plug 20, thus, the conversion plug 20 is detached from the device body 10.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. This application is based on Application No. 2005-237014 filed in Japan on Aug. 17, 2005, the content of which is incorporated hereinto by reference.

What is claimed is:

1. An electrical device comprising:

a device body;

an AC plug including a pair of plug blades and an insulating pivot mount, said insulating pivot mount pivotably connecting said AC plug to said device body;

a conversion plug detachably connectable to said AC plug;

wherein said insulating pivot mount pivots in a direction parallel to a plane of each of said plug blades such that said AC plug is pivotable between a collapsed state and an upright state;

wherein said device body includes a first guide space portion and a second guide space portion, each of said first guide space portion and said second guide space portion accommodating one plug blade of said pair of plug blades when said AC plug is disposed in said collapsed state;

wherein a retaining recessed portion is defined in said insulating pivot mount, said retaining recessed portion being pivotable with said insulating pivot mount such that said retaining recessed portion faces an exterior of said device body when said AC plug is disposed in said upright state;

wherein said conversion plug includes insertion portions configured to receive said plug blades, said insertion portions being conductive for electrical connection with said plug blades;

wherein said conversion plug includes a retaining hook, said retaining hook being insulative and insertable in said retaining recessed portion to form an insulative mechanical connection such that said conversion plug is retained on said device body when said plug blades are inserted in said insertion portions for electrical connection;

wherein said AC plug is configured to be insertable in a first outlet when said conversion plug is not retained on said device body;

wherein said conversion plug is provided with a shape different than said AC plug such that said electrical device is insertable in a second outlet shaped differently than said first outlet when said conversion plug is retained on said device body; and wherein said insulating pivot mount pivots to open said retaining recessed portion to an exterior of said device body when said AC plug is moved to said upright state such that said conversion plug is connectable with said plug blades by inserting said retaining hook into said retaining recessed portion, and said insulating pivot mount pivots to close said retaining recessed portion when said AC plug is moved to said collapsed state such that said conversion plug is not connectable with said plug blades.

2. The electrical device according to claim 1, wherein each of said first guide portion and said second guide portion has a length such that said AC plug does not protrude beyond said device body in said collapsed state.

3. The electrical device according to claim 1, wherein said plug blades are composed of a pair of planar metal plates fastened to said insulating pivot mount, and said insulating pivot mount is made of plastic.

4. The electrical device according to claim 1, wherein said insulating pivot mount of said AC plug is provided with pivot shaft portions that protrude from opposing sides of said AC plug, said pivot shaft portions being rotatably connected to said device body.

5. The electrical device according to claim 1, wherein said retaining recessed portion is located between said pair of plug blades.

6. The electrical device according to claim 1, wherein said conversion plug includes a pair of pin plugs fastened to an insulating holder.

7. The electrical device according to claim 6, wherein said insulating holder of said conversion plug is made of plastic, and includes a main holder and an inner holder fastened to said main holder.

8. The electrical device according to claim 7, wherein said inner holder of said conversion plug is fastened to said main holder such that said pin plugs are fastened to said insulating holder.

9. The electrical device according to claim 8, wherein said main holder of said conversion plug is provided with a pair of through holes, said through holes being wider than a width of said pin plugs, wherein said main holder is formed with a hollow body such that said inner holder and said plug blades can be inserted into said main holder, and wherein said inner holder has cylindrical portions that hold peripheries of said pin plugs, said cylindrical portions being inserted to said through holes of said main holder for holding said pin plugs in position.

10. The electrical device according to claim 1, wherein said plug insertion portion of said conversion plug has an inside width wider than an outside width of said plug blade such that said plug blades are movable in a direction perpendicular to a longitudinal axis of each of said plug blades.

11. The electrical device according to claim 6, wherein said insulating holder of said conversion plug includes connection mechanisms that electrically connect said pair of plug blades to said pin plugs when said plug blades are inserted into said plug insertion portions.

12. The electrical device according to claim 11, wherein said connection mechanisms are resilient contacts fastened to bottom ends of said pin plugs.

13. The electrical device according to claim 6, wherein said retaining hook of said conversion plug extends from a surface of said insulating holder.

14. The electrical device according to claim 1, wherein said retaining hook of said conversion plug is located between said plug insertion portions.

15. The electrical device according to claim 1, wherein a bottom end of said retaining hook of said conversion plug is formed with a cross-section shaped as an L-shaped hook.

16. The electrical device according to claim 1, further including a lock mechanism to detachably connect said conversion plug to said device body.

17. The electrical device according to claim 16, wherein said lock mechanism includes a lock hook disposed in said device body, a lock retaining portion provided in said conversion plug to retain said lock hook, and a stopper for maintaining a connection between said lock hook and said lock retaining portion.

18. The electrical device according to claim 17, wherein said lock hook of said device body is located between said first guide space portion and said second guide space portion.

19. The electrical device according to claim 1, wherein said conversion plug includes a first connection protrusion portion that is inserted into said first guide space portion and a second connection protrusion portion that is inserted into said second guide space portion.

20. The electrical device according to claim 19, wherein said conversion plug includes a rib connecting said first connection protrusion portion and said second connection protrusion portion, said rib being arranged such that a lock retaining portion is formed in said rib.

21. The electrical device according to claim 1, wherein said retaining hook protrudes from said conversion plug in a direction parallel to a longitudinal axis of said plug blades.

22. The electrical device according to claim 1, wherein said conversion plug is connectable to said AC plug by inserting said plug blades in said insertion portions and displacing said conversion plug in a first direction relative to said AC plug, and wherein said retaining hook protrudes from said conversion plug in a direction parallel to said first direction.

23. The electrical device according to claim 1, wherein said insulating pivot mount defines said retaining recessed portion such that said retaining recessed portion opens toward a bottom surface of said device body when said AC plug is in said upright state.

24. The electrical device according to claim 17, wherein said retaining recessed portion is constituted by a cavity in said insulating pivot mount, wherein a protrusion portion extends between said first guide space portion and said second guide space portion such that said conversion plug is not connectable with said plug blades when said AC plug is in said collapsed state, and wherein said lock hook of said lock mechanism is disposed on said protrusion portion such that said protrusion portion separates said lock hook from said retaining recessed portion.

25. The electrical device according to claim 1, further comprising a recessed portion provided on the device body, said recessed portion being operable to accept at least one rechargeable battery such that said electrical device is operable to charge said at least one rechargeable battery.

* * * * *